United States Patent [19]

Bamber et al.

[11] Patent Number: 5,467,258
[45] Date of Patent: Nov. 14, 1995

[54] FLASHLIGHT APPARATUS

[75] Inventors: David Bamber; Robert Deines, both of Wichita, Kans.

[73] Assignee: The Coleman Company, Inc., Wichita, Kans.

[21] Appl. No.: 988,832

[22] Filed: Dec. 21, 1992

[51] Int. Cl.$^6$ .................................................. F21L 9/00
[52] U.S. Cl. ........................ 362/184; 362/183; 362/191; 362/205; 320/2
[58] Field of Search .................... 362/183, 184, 362/190, 191, 200, 202, 205, 208, 396, 251; 320/2; 439/530, 568

[56] References Cited

U.S. PATENT DOCUMENTS

| | | | |
|---|---|---|---|
| 2,293,284 | 8/1942 | Emanuel | 320/2 |
| 3,261,973 | 7/1966 | Kott | 362/183 |
| 3,710,224 | 1/1973 | Daniels | 320/2 |
| 4,171,534 | 10/1979 | Strowe | 362/183 |
| 4,224,658 | 9/1980 | Siiberg | 362/183 |
| 4,317,162 | 2/1982 | Richards et al. | 362/183 |
| 4,329,740 | 5/1982 | Colvin | 362/251 |
| 4,432,043 | 2/1984 | Yuen | 362/184 |
| 4,467,263 | 8/1984 | Conforti et al. | 320/2 |
| 4,535,391 | 8/1985 | Hsiao | 362/251 |
| 4,598,340 | 7/1986 | Dwosh et al. | 362/98 |
| 4,605,993 | 8/1986 | Zelina, Jr. | 362/183 |
| 4,740,872 | 4/1988 | Chou | 362/184 |
| 4,831,504 | 5/1989 | Nishizawa | 362/184 |
| 4,847,738 | 7/1989 | Nehl | 362/183 |
| 5,075,615 | 12/1991 | Dantis | 320/2 |
| 5,077,643 | 12/1991 | Leach | 362/183 |
| 5,077,644 | 12/1991 | Schaller et al. | 362/184 |
| 5,165,048 | 11/1992 | Keller et al. | 362/183 |

FOREIGN PATENT DOCUMENTS

| | | | |
|---|---|---|---|
| 0229736 | 11/1943 | Switzerland | 362/183 |
| 24915 | 3/1979 | Taiwan . | |
| 50589 | 5/1983 | Taiwan . | |
| 0427480 | 6/1943 | United Kingdom | 362/183 |

*Primary Examiner*—Stephen F. Husar
*Assistant Examiner*—Alan B. Cariaso
*Attorney, Agent, or Firm*—Tilton, Fallon, Lungmus & Chestnut

[57] ABSTRACT

The flashlight apparatus of the present invention includes a rechargeable flashlight and a bracket which mounts the flashlight to a support during recharging. The flashlight includes two light sources, a first switch for activating its power source and a second switch for selecting which of the two light sources the power source energizes.

10 Claims, 3 Drawing Sheets

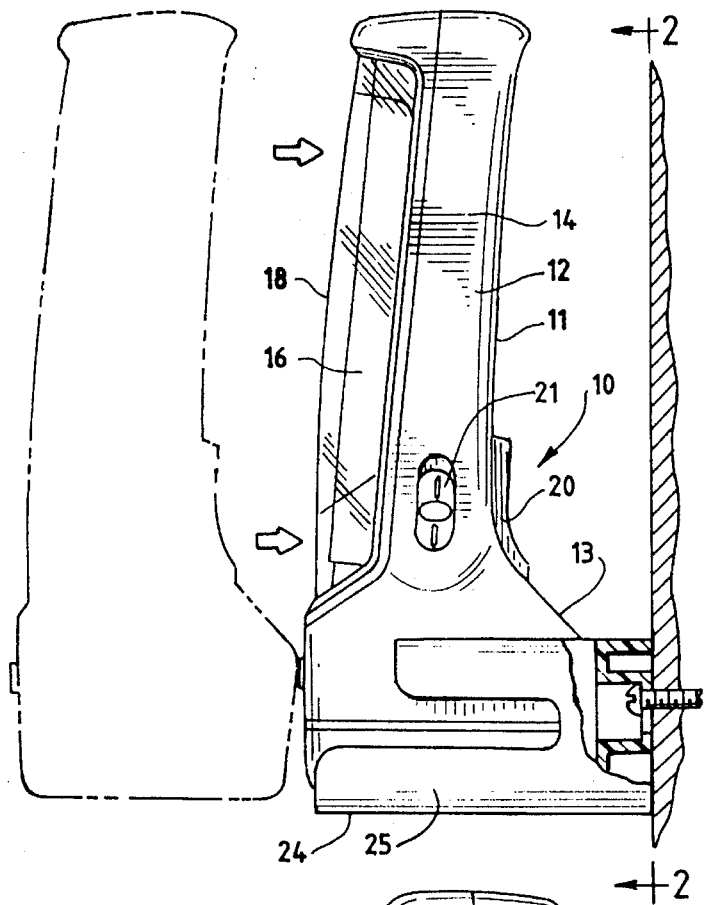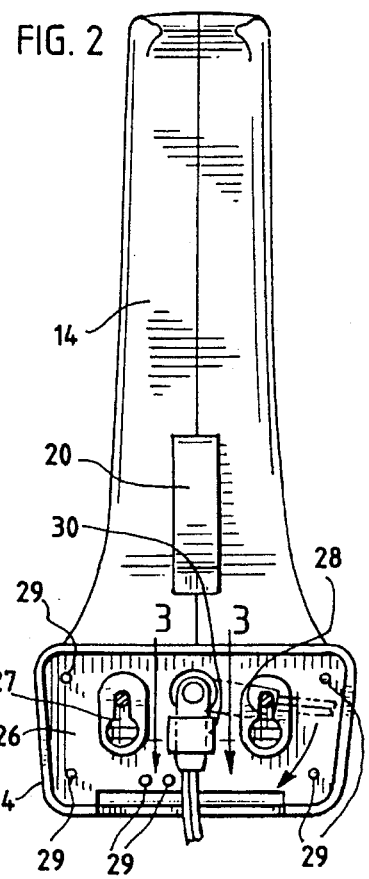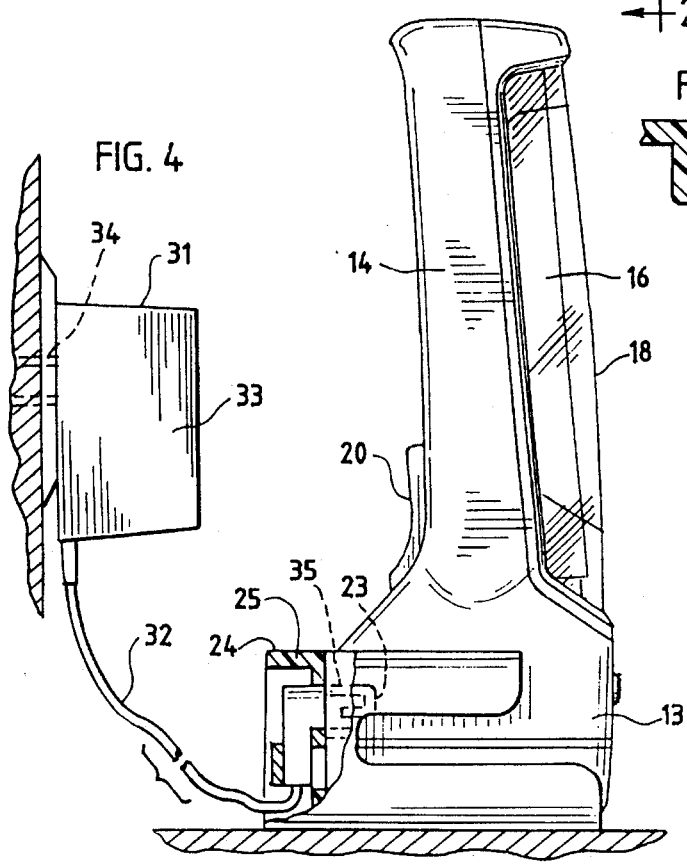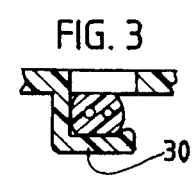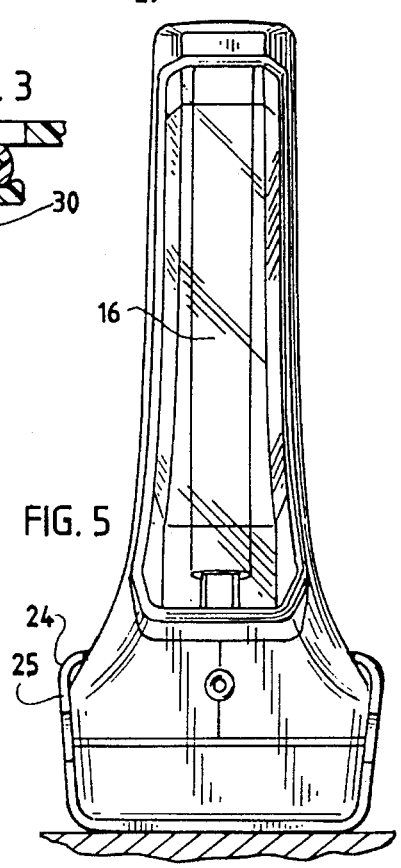

FLASHLIGHT APPARATUS

BACKGROUND OF THE INVENTION

The present invention relates to a flashlight apparatus, and more particularly to a rechargeable flashlight and a mounting bracket for mounting the flashlight to a support while recharging the flashlight's power source.

Rechargeable flashlights should have a construction which provides effective lighting in a variety of environments. This construction should also allow easy mounting to a support during recharging and easy dismounting. The flashlight apparatus meets this criteria.

SUMMARY OF THE INVENTION

In accordance with one embodiment of the present invention, a flashlight apparatus includes a rechargeable flashlight with a housing for containing a power source. A first light source lies at one end of the flashlight. A second light source lies at a handle portion of the housing.

The flashlight includes a first, power switch disposed on the housing for activating the power source. It also includes a second, selecting switch connected to the first switch and to the first and second light sources for selecting which of the first or second light sources the power source energizes.

A bracket for mounting the rechargeable flashlight to a support includes wall means for receiving a head portion of the flashlight. A plug used to recharge the flashlight cooperates with the bracket to releasably secure the head of the flashlight to the bracket.

BRIEF DESCRIPTION OF THE DRAWINGS

For a more complete understanding of this invention one should now refer to the embodiment illustrated in greater detail in the accompanying drawings and described below by way of an example of the invention. In the drawings:

FIG. 1 is a side elevation view of the flashlight apparatus of the present invention, showing the rechargeable flashlight mounted to a vertical support;

FIG. 2 is a rear elevation view thereof;

FIG. 3 is a sectional view taken along line 3—3 in FIG. 2;

FIG. 4 is a side elevation view of the flashlight apparatus placed on a horizontal support;

FIG. 5 is a front elevation view thereof;

Figure 6:
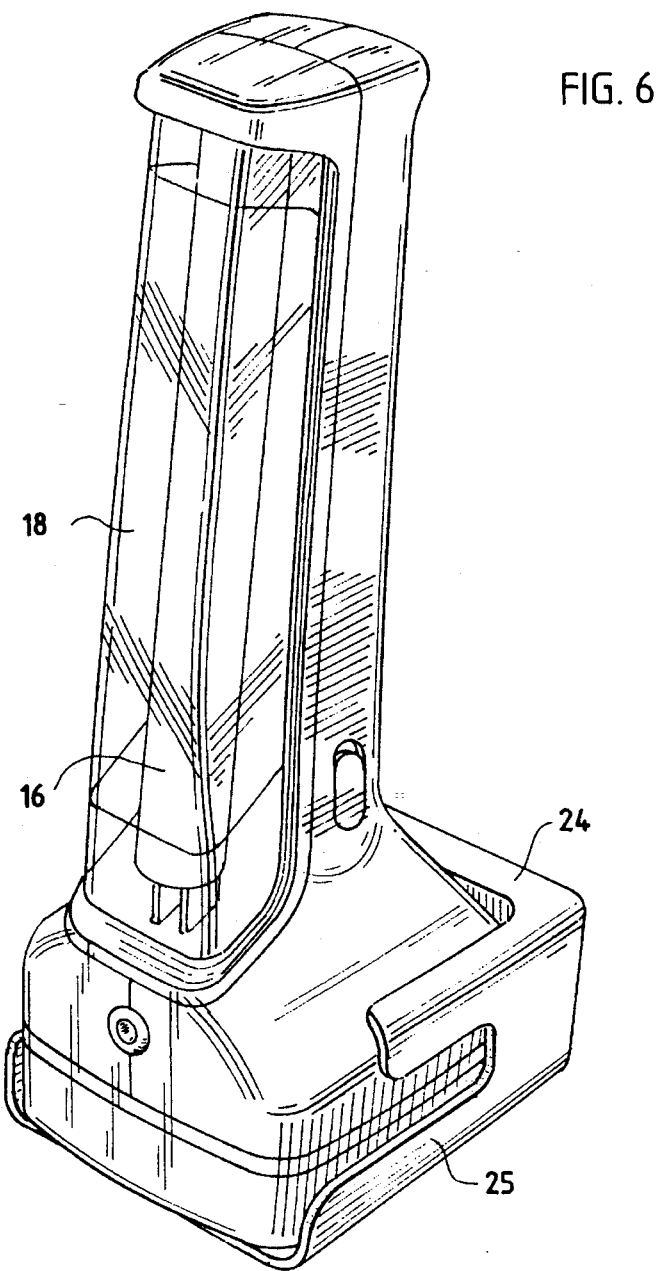
FIG. 6 is a perspective view of the flashlight apparatus of the present invention.
Figure 7:
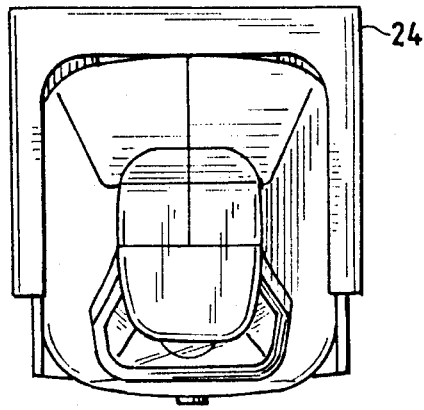
FIG. 7 is an end view thereof.
Figure 8:
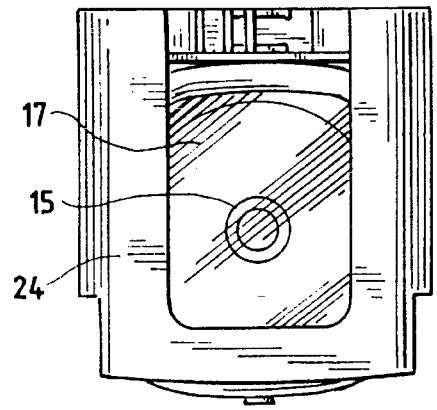
FIG. 8 is an end view opposite the end shown in FIG. 7.

While the following disclosure describes the invention in connection with one embodiment, one should understand that the invention is not limited to this embodiment. Furthermore, one should understand that the drawings are not to scale and that graphic symbols, diagrammatic representations, and fragmentary view, in part, illustrate the embodiment. In certain instances, the disclosure may not include details which are not necessary for an understanding of the present invention such as conventional details of fabrication and assembly.

DETAILED DESCRIPTION OF THE DRAWINGS AND AN EMBODIMENT

Referring now to the drawings and to FIGS. 1–8, one form of the flashlight apparatus 10 includes a rechargeable flashlight 11 with a housing 12. The housing 12 is made of a thermoplastic material of high strength and rigidity. It includes a head portion 13 and an elongate handle portion 14; and it contains a power source (e.g., one or more batteries, not shown).

The flashlight 11 has two light sources 15 and 16 disposed in the housing 12. The first light source 15 (See FIG. 8) is an incandescent bulb mounted in the head portion 13 below a transparent panel or lens 17 which allows emission of light from the light source 15 and outwardly of the flashlight 11. The second light source 16 is a fluorescent tube mounted in the handle portion 14 longitudinally of it. The tube 16 lies substantially co-extensive with the handle portion below a transparent cover 18 which forms a part of the handle portion 14.

Figure 9:
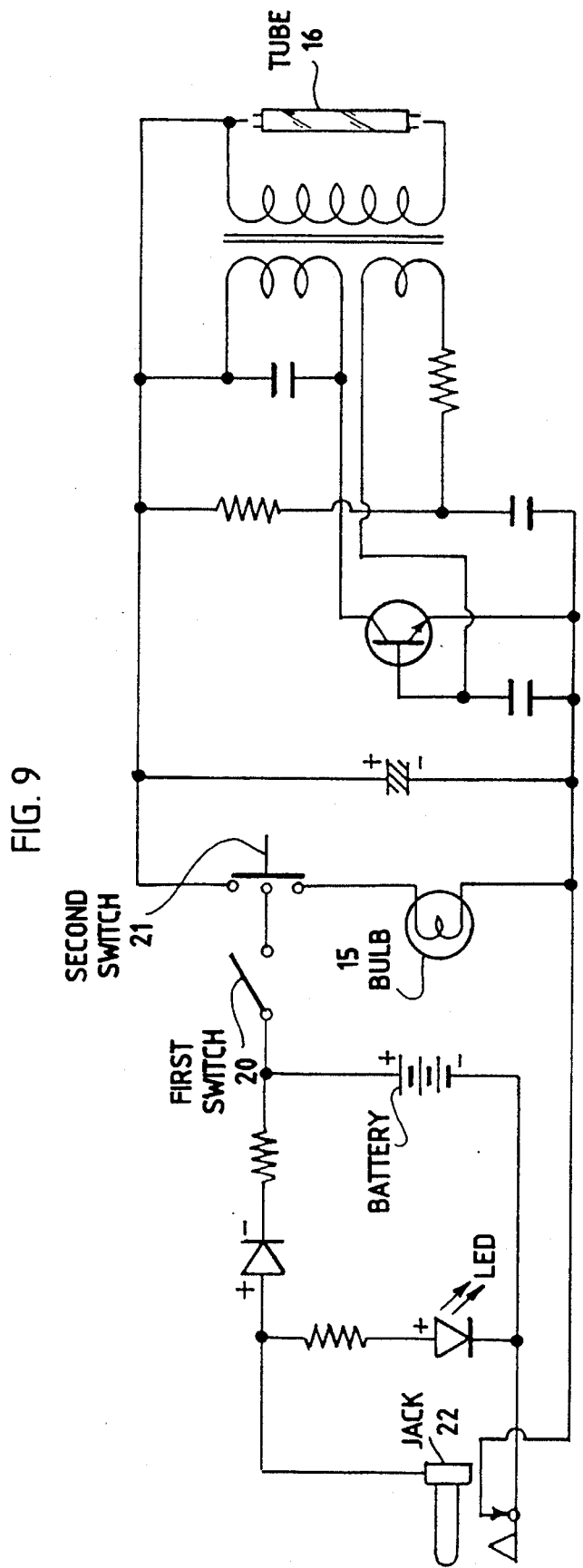
FIG. 9 is a schematic of the circuit used in the flashlight apparatus of the present invention.

A circuit 19 shown in FIG. 9 and used in the flashlight of FIGS. 1–8 includes leads which connect the power source and the two light sources 15 and 16 in parallel. A first, power switch 20 connected to the power source activates the power source to energize one of the two light sources 15 and 16. A second, selecting switch 21 connected to the two light sources and to the first switch allows selection of the first or second light sources for energizing. A jack 22, including a plug 23 (See FIG. 4) for recharging the power source, precludes the power source from energizing the light sources during recharging.

The first switch 20 lies mounted to the handle portion 14 of the housing at the bottom of the handle portion where a user may easily manipulate it with his or her index finger. The second switch lies mounted to the handle portion at its side where a user may easily manipulate it with his or her thumb.

The flashlight apparatus 10 also includes a bracket 24 for mounting the flashlight 11 to a support. The bracket includes walls which form its body 25 and define a generally rectangular pocket open on two sides to receive the head portion 13 of the flashlight 11. The back 26 of this body 25 (See FIG. 2) defines two openings 27 and 28 through which screws or other similar devices extend to secure the bracket to a support (See FIGS. 1 and 2). It also defines pins 29 around which a user may wind the chord of a recharging assembly described below. Finally, the back of the body 25 defines a hook segment 30 (See FIGS. 2 and 3) which releasably secures the plug 23 of a recharging assembly 31.

The recharging assembly 31 (See FIG. 4) also includes a chord 32 and a transformer 33 with a second plug 34 which connects the assembly to an electrical outlet. The plug 23 extends into a receptacle 35 of the flashlight 11 to form the jack shown in FIG. 9. In doing so, it cooperates with the bracket 24 to releasably secure the flashlight 11 to the bracket.

While the above description and the drawings disclose and illustrate one embodiment, one should understand, of course, that the invention is not limited to this embodiment. Those skilled in the art to which the invention pertains may make modifications and other embodiments employing the principles of this invention, particularly upon considering the foregoing teachings. Therefore, by the appended claims, the applicants intend to cover any modifications and other embodiments as incorporate those features which constitute the essential features of this invention.

What is claimed is:

1. A flashlight apparatus comprising: a housing for containing a power source, said housing including an elongate handle portion and a head portion; a first, power switch means connectable to the power source for activating the power source, said first switch means being disposed at the handle portion of the housing proximate the head portion; a first light source disposed in the head portion at one end of the housing; a second light source disposed at the handle portion of the housing; a second, selecting switch means disposed proximate the first switch means so that a user may operate the first and second switch means while holding the apparatus, said second switch means connected to said first switch means and to the first and second light sources for selecting either the first or the second light sources for energizing by the power source.

2. The flashlight apparatus of claim 1, wherein the first light source is an incandescent light source and the second light source is a fluorescent light source.

3. The flashlight apparatus of claim 2, wherein the second light source is an elongate tube which extends longitudinally of the handle portion.

4. The flashlight apparatus of claim 3, wherein the elongate tube extends across a substantial portion of the handle portion.

5. The flashlight apparatus of claim 4, wherein the first switch means lies at a bottom segment of the handle portion where a user may reach it with his or her index finger and the second switch means lies at a side segment of the handle portion.

6. The flashlight apparatus of claim 1, further comprising jack means for connecting the power source to a recharging source.

7. In combination with a flashlight which includes a housing with a head portion and a handle portion; a bracket member for mounting the flashlight to a support member, said bracket member including wall means for defining a pocket for receiving the head portion of the flashlight, and a plug member secured to said bracket member and projecting into the pocket of the bracket, the plug member cooperating with the bracket member to releasably secure the head of the flashlight in the pocket, said bracket member being open on two sides to allow insertion of the flashlight through one open side while the flashlight extends through the other open side.

8. The combination of claim 7, wherein the flashlight includes a receptacle for receiving the plug member.

9. The combination of claim 8, wherein the bracket member includes a hook portion for releasably securing the plug member to the bracket.

10. The combination of claim 7, wherein the flashlight comprises a first, power switch means connectable to a power source for activating the power source, said first switch means being disposed at the handle portion of the housing proximate the head portion; a first light source disposed in the head portion at one end of the housing; a second light source disposed at the handle portion of the housing; a second, selecting switch means disposed proximate the first switch means so that a user may operate the first and second switch means while holding the flashlight, said second switch means connected to said first switch means and to the first and second light sources for selecting either the first or the second light sources for energizing by the power source.

* * * * *